(12) United States Patent
Bodin et al.

(10) Patent No.: US 8,010,423 B2
(45) Date of Patent: Aug. 30, 2011

(54) ANTICIPATORY MOBILE SYSTEM SERVICE BROKERING AND RESOURCE PLANNING FROM MULTIPLE PROVIDERS

(75) Inventors: William Kress Bodin, Austin, TX (US); Bryan William Clark, Londonberry, NJ (US); Albert Chung-Chee Kwok, Fremont, CA (US); John Richard Del Pizzo, Jr., Cranberry Township, PA (US); Wojciech T. Stryjewski, Baton Rouge, LA (US); David Patrick Huff, Cary, NC (US); Derral Charles Thorson, Austin, TX (US); Michael Karasick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1574 days.

(21) Appl. No.: 10/232,246

(22) Filed: Aug. 29, 2002

(65) Prior Publication Data

US 2004/0044605 A1   Mar. 4, 2004

(51) Int. Cl.
*G06F 17/60* (2006.01)
(52) U.S. Cl. ........................ 705/35; 705/14.63
(58) Field of Classification Search .............. 705/1–88, 705/1–50, 35, 45; 701/211; 706/12; 370/259; 800/260, 305
See application file for complete search history.

(56) References Cited

U.S. PATENT DOCUMENTS

| | | | |
|---|---|---|---|
| 5,210,789 A | 5/1993 | Jeffus et al. | |
| 5,214,582 A | 5/1993 | Gray | |
| 5,442,553 A | 8/1995 | Parrillo | 455/420 |
| 5,499,295 A | 3/1996 | Cooper | |
| 5,619,412 A | 4/1997 | Hapka | |
| 5,815,071 A | 9/1998 | Doyle | 340/439 |
| 5,831,992 A | 11/1998 | Wu | |
| 5,922,037 A | 7/1999 | Potts | 701/29 |
| 5,999,908 A | 12/1999 | Abelow | |
| 6,067,570 A | 5/2000 | Kreynin et al. | |
| 6,094,609 A | 7/2000 | Arjomand | 701/29 |
| 6,105,063 A | 8/2000 | Hayes, Jr. | |
| 6,285,931 B1 | 9/2001 | Hattori et al. | 701/29 |
| 6,289,382 B1 | 9/2001 | Bowman-Amuah | |
| 6,292,724 B1 | 9/2001 | Apsell et al. | 701/29 |
| 6,313,786 B1 * | 11/2001 | Sheynblat et al. | 342/357.02 |
| 6,330,499 B1 * | 12/2001 | Chou et al. | 701/33 |
| 6,339,736 B1 | 1/2002 | Moskowitz et al. | 701/29 |

(Continued)

OTHER PUBLICATIONS

PR Version staff, Naystar GPS user equipment introduction, Sep. 1996, Navstar, pp. 1-20.*

(Continued)

*Primary Examiner* — Shahid R Merchant
*Assistant Examiner* — Marissa Liu
(74) *Attorney, Agent, or Firm* — Robert H. Frantz; Libby Z. Toub (57) ABSTRACT

An opportunity server searches for potential vehicle repair transaction providers by receiving a signal from a mobile system indicating a need for a transaction with a business entity responsive to an on-board diagnostic detection of a real-time fault condition resulting in recording of a Diagnostic Trouble Code; automatically issuing requests for bids for the transaction to provider parties located in a first potential geographic point for repair service indicating estimated times of arrival at each geographic point; receiving offers from the provider parties; automatically coalescing the offers by screening to meet user preferences, and modifying and organizing into a format for uniform presentation to a user; presenting the coalesced offers to an operator of the mobile system; and automatically performing enterprise resource planning for a user-selected business transaction.

9 Claims, 4 Drawing Sheets

U.S. PATENT DOCUMENTS

| | | | |
|---|---|---|---|
| 6,362,730 B2 | 3/2002 | Razavi et al. | |
| 6,370,454 B1 | 4/2002 | Moore | 701/29 |
| 6,529,808 B1 | 3/2003 | Diem | |
| 6,571,279 B1 | 5/2003 | Herz et al. | |
| 6,640,166 B2 | 10/2003 | Liebl et al. | |
| 6,647,328 B2 | 11/2003 | Walker | |
| 6,691,253 B1 | 2/2004 | Gillenwater et al. | |
| 6,717,527 B2 | 4/2004 | Simon | |
| 6,718,235 B1 | 4/2004 | Borugian | |
| 6,748,322 B1 | 6/2004 | Fernandez | |
| 6,754,562 B2 | 6/2004 | Strege et al. | |
| 6,801,604 B2 | 10/2004 | Maes et al. | |
| 6,847,872 B2 | 1/2005 | Bodin et al. | |
| 6,877,661 B2 * | 4/2005 | Webb et al. | 235/462.01 |
| 6,961,760 B2 | 11/2005 | Li et al. | |
| 6,978,316 B2 | 12/2005 | Ghaffar et al. | |
| 7,054,648 B2 | 5/2006 | Abtin et al. | |
| 7,171,189 B2 | 1/2007 | Bianconi et al. | |
| 7,200,566 B1 | 4/2007 | Moore et al. | |
| 2001/0036224 A1 | 11/2001 | Demello et al. | |
| 2001/0037168 A1 | 11/2001 | Hozuka | 701/29 |
| 2001/0056544 A1 | 12/2001 | Walker | |
| 2002/0044049 A1 | 4/2002 | Saito et al. | |
| 2002/0045976 A1 | 4/2002 | Kodama | 701/29 |
| 2002/0049535 A1 * | 4/2002 | Rigo et al. | 701/211 |
| 2002/0077780 A1 | 6/2002 | Liebl et al. | |
| 2002/0077781 A1 | 6/2002 | Liebl et al. | |
| 2002/0119766 A1 | 8/2002 | Bianconi et al. | |
| 2003/0009401 A1 * | 1/2003 | Ellis | 705/35 |
| 2003/0017826 A1 | 1/2003 | Fishman et al. | |
| 2003/0078019 A1 | 4/2003 | Dorenbsoch et al. | |
| 2003/0093187 A1 | 5/2003 | Walker | |
| 2003/0130893 A1 | 7/2003 | Farmer | |
| 2003/0158894 A1 | 8/2003 | Ziserman | |
| 2003/0163249 A1 | 8/2003 | Kapolka et al. | |
| 2003/0172090 A1 | 9/2003 | Asunmaa et al. | |
| 2003/0195845 A1 | 10/2003 | Anton, Jr. et al. | |
| 2004/0010592 A1 | 1/2004 | Carver et al. | |
| 2004/0030995 A1 | 2/2004 | Bhogal et al. | |
| 2004/0064268 A1 | 4/2004 | Gillenwater et al. | |
| 2004/0125755 A1 | 7/2004 | Roberts | |
| 2004/0203581 A1 | 10/2004 | Sharon et al. | |
| 2004/0205694 A1 | 10/2004 | James et al. | |
| 2004/0215665 A1 | 10/2004 | Edgar et al. | |
| 2006/0274896 A1 | 12/2006 | Livesay | |

OTHER PUBLICATIONS

"Information Everywhere—New Opportunities for Pervasive Technology", IBM Corporation, Mar. 2000, downloaded from http://www.ibm.com, 8 pages.

USPTO; recent examination correspondence from related U.S. Appl. No. 11/263,713, filed on Nov. 1, 2005 by William Kress Bodin, currently under allowance.

USPTO; recent examination correspondence in related U.S. Appl. No. 12/184,217, filed on 12/184,217, by William Kress Bodin, currently under Notice of Allowance.

Jules, Coleman; Markets, Morals, and the law; Oct. 2002, Oxford University Press, pp. 87-91,94,98, 104-105.

United States Patent Office, patent application examination correspondence in U.S. Appl. No. 10/290,399, filed on Nov. 7, 2002, issued as US patent 6,847,872.

United States Patent Office, patent application examination correspondence in U.S. Appl. No. 10/980,728, filed on Nov. 3, 2004, by William Kress Bodin, issued as US patent 6,983,200, published at and retrieved from http://www.uspto.gov Patent Application Information Retrieval (Pair) Image File Wrapper (IFW) on Mar. 4, 2010.

United States Patent Office, patent application examination correspondence in U.S. Appl. No. 10/290,381, filed on Nov. 7, 2002, by William Kress Bodin, now abandoned, published at and retrieved from http://www.uspto.gov Patent Application Information Retrieval File Wrapper (IFW) on Mar. 4, 2010.

United States Patent Office, patent application examination correspondence in U.S. Appl. No. 10/290,223, filed on Nov. 7, 2002, by William Kress Bodin, issued as US patent 7,346,439, published at and retrieved from http://www.uspto.gov Patent Application Information Retrieval File Wrapper (IFW) on Mar. 4, 2010.

United States Patent Office, patent application examination correspondence in U.S. Appl. No. 10/290,391, filed on Nov. 7, 2002, by William Kress Bodin, issued as US patent 7,447,642, published at and retrieved from http://www.uspto.gov (IFW) on Mar. 4, 2010.

United States Patent Office, patent application examination correspondence in U.S. Appl. No. 10/290,390, filed on Nov. 7, 2002, by William Kress Bodin, now abandoned, published at and retrieved from http://www.uspto.gov Patent Application Information Retrieval Image File Wrapper (IFW) on Mar. 4, 2010.

United States Patent Office, patent application examination correspondence in U.S. Appl. No. 11/263,713, filed on Nov. 1, 2005, by William Kress Bodin, published at and retrieved from http://www.uspto.gov (IFW) on Mar. 23, 2010.

USPTO; recent examination correspondence from related patent U.S. Appl. No. 11/843,945, filed on Aug. 23, 2007 by William Kress Bodin.

USPTO; recent examination correspondence on Aug. 16, 2010 in related patent U.S. Appl. No. 11/263,713, filed on Nov. 1, 2005 by William Bodin, in which some claims are idicated as allowable.

M2 Presswire Coventry, Openwave Systems: openwave Download Manager delivers Java to mobile subscribers; Games, ringtones, images and more, east to access, purchase and store, Sep. 27, 2002, p. 1.

m2 PressWire, Sharp: Sharp introduces the new personal information tool, Apr. 15, 1999, p. 1.

\* cited by examiner

ANTICIPATORY MOBILE SYSTEM SERVICE BROKERING AND RESOURCE PLANNING FROM MULTIPLE PROVIDERS

BACKGROUND OF THE INVENTION

1. Field of the Invention

This invention relates to the technologies of automated and preemptive service determination, brokering and scheduling for moving systems such as automobiles, trains, trucks, ships, and aircraft.

2. Background of the Invention

Vehicles are traditionally designed and built with a finite set of gauges or indicator warning lights which are intended to convey vital operational status to the operator of the vehicle. For example, many automobiles are equipped with a temperature gauge or warning light, and an oil pressure gauge or warning light, on the dashboard. If a temperature gauge enters a range indicating higher than normal operating coolant temperature, the driver may choose to continue driving until a service station is reached. For indicator lights, often referred to as "dummy lights", the light may be illuminated when the temperature has reached a critical point, leaving the driver with even fewer options (e.g. less time to find a service station). Most automobiles, however, are equipped many sensors in the engine, electrical, electronic, and drive train subsystems, which provide more information regarding the status of the engine. This detailed information, however, is not usually presented to the driver, but is maintained in memory by an on-board computer for later analysis by an automotive technician and/or diagnostic computer. During the operation of the vehicle, the on-board computer may simply determine if a sensor indicates a potential problem and decide to illuminate a warning light.

Most modern vehicles, including ships, aircraft, trains, trucks and cars, follow this convention of collecting a large amount of sensor and indicator data from the vehicle's subsystems, storing these data items in memory, and presenting simple, "high level" indicators to the vehicle operator (e.g. pilot, captain, etc.).

So, for example, when a driver sees an over-temperature indicator light or notices a temperature gauge in the "hot" range, he must make a fairly uninformed decision as to how to proceed. If he is driving on a highway, he must decide to "chance it" and continue driving until the next town or service center is reached in the hopes that an appropriately-equipped and staffed repair shop will be found. By doing so, he risks causing expensive damage to the vehicle's engine. If he chooses to take such a risk and upon arrival at the next town finds that no appropriately equipped or staffed shop is available, he may have to pay for a tow anyway, thereby finding that he incurred the risk of engine damage unnecessarily (e.g. he could have stopped on the roadside and called for a tow).

This particular problem has become even more pronounced as the automobile industry has diversified in recent years. Many consumers are purchasing vehicles which are made by manufacturers who have small portions of market share in the country where they reside, and thus there are fewer repair centers which are equipped with the diagnostic equipment for his or her particular make-and-model of vehicle and who have appropriately trained staff for the needed repair. In one example, a driver may have a car which cannot be serviced by any shop in the next town because it is manufactured by a company which does not have a dealer in town. In another example situation, a dealer for the driver's car may be in town, but the malfunction may be in a subsystem for which the dealer does not have a trained technician currently on staff or on call (e.g. a problem within the transmission but the dealer has no transmission technicians on staff). A third aspect of whether or not service can be obtained as needed is whether or not a service center has ready access to spare parts and replacement components, as may be required.

All travel is time dependent (e.g. there is an itinerary to be kept), whether it is a road trip in a car by a private consumer, a transoceanic shipment by ship or a scheduled airline flight, and as such, all of these factors must be met in a timely fashion to minimize the economic, social, and financial impact of a vehicle repair:

(a) availability of an appropriate business entity to provide the service (e.g. car repair shop, aircraft maintenance depot, etc.);
(b) availability of appropriately skilled service personnel;
(c) availability necessary facilities, tools and systems (e.g. diagnostic systems, repair tools, etc.); and
(d) availability of components and repair parts.

In most cases, another factor of obtaining service is whether or not the price or cost of the service is acceptable to the operator of the vehicle. In some cases, such as having a car indicator illuminate while on a cross-country trip or visiting a city away from home, the driver may anticipate being charged an exorbitant amount for a routine repair, and as such, may decide not to seek service until returning to his or her home town, further increasing his or her risk for greater vehicle damage and possibly causing safety problems.

As a result, while ample diagnostic information to determine a needed service and replacement component is often collected by vehicle on-board computers and sensors, and while some operational time before arriving at a point of possible service is often available (e.g. driving time to next town, flight time to land at next airport, travel time to next train depot, etc.), this time is not wisely used to search for appropriate service providers and to negotiate for acceptable service cost. Normally, the operator of the vehicle will begin these processes after arriving at the next point of service, which may incur additional costs (e.g. overnight shipping of parts, hotel stays, rental vehicles, etc.) and may cause undesirable delays to the itinerary.

Many vehicle operators and vehicles are equipped with communications systems (e.g. radio, wireless telephones, etc.) which allow them to communicate to some degree their problem while in transit, and to attempt to set arrangements for service at the next point of service. However, this can be ineffective as it can be very difficult, for example, for a car driver to obtain quotes for parts and service while driving on a highway, especially because he or she is not privy to the detailed error codes stored in the on-board computer's memory thereby making an accurate diagnosis difficult.

Still other systems, such as General Motor's On Star™ system, provides for triggering of communications such as a cell telephone to call to an operator when certain conditions are detected, such as deployment of an airbag. Generally, this only helps the driver get in contact with possible assistance, but does not relieve the driver of the mental distraction trying to describe a problem and to negotiate for a service action. Another potentially useful service are cellular-based concierge services, which allows a driver to call a single point of contact to initiate assistance such as scheduling a car maintenance appointment. These services, however, are more general purpose in nature (e.g. making hotel reservations, obtaining show tickets, etc.), and are of limited assistance with handling detailed vehicle trouble and maintenance discussions. In either of these cases, the on-board diagnostic information is neither available to the driver, the assisting telephone operator or concierge for accurate and precise planning of a maintenance service.

Therefore, there is a need in the art for a system and method which utilizes the time available between the first time of detection of a potential problem on a mobile system or vehicle in transit and the time to arrival at a point of service to determine potential providers, obtain quotes from the service providers, select a provider and schedule the service action such that itinerary impact is minimized, safety and convenience to the vehicle operator is maximized, and exorbitant unexpected expenses are eliminated.

BRIEF DESCRIPTION OF THE DRAWINGS

The following detailed description when taken in conjunction with the figures presented herein provide a complete disclosure of the invention.

SUMMARY OF THE INVENTION

The invention integrates the on-board diagnostics capabilities of mobile systems such as vehicles, location based services technologies, and networked supply chain management technologies to provide anticipatory arrangement of required services and maintenance actions. Based upon real-time fault condition detection in a mobile system and upon the system's location and direction of travel, one or more potential geographic points of service, preferably within the scheduled itinerary of travel, is determined. The fault or trouble indicators are then analyzed to determine minimum service provider characteristics (e.g. hours of operation, staff qualifications, equipment and parts on-hand, etc.), and quotes or estimates for expected service actions are solicited and collected from partner provider systems.

These quotes are analyzed and presented to the mobile system operator for selection, either manually or automatically, based upon user preferences. If a service provider is selected, the service is scheduled according to an estimated time of arrival of the mobile system, including arranging for parts to be procured in advance such that there is minimal delay to the travel itinerary for the completion of the service.

If no service provider is found or selected, a second wider search for potential providers may be made to minimize deviation from the itinerary, including solicitation of quotes and estimates, selection and scheduling of the service actions.

DETAILED DESCRIPTION OF THE INVENTION

Figure 1:
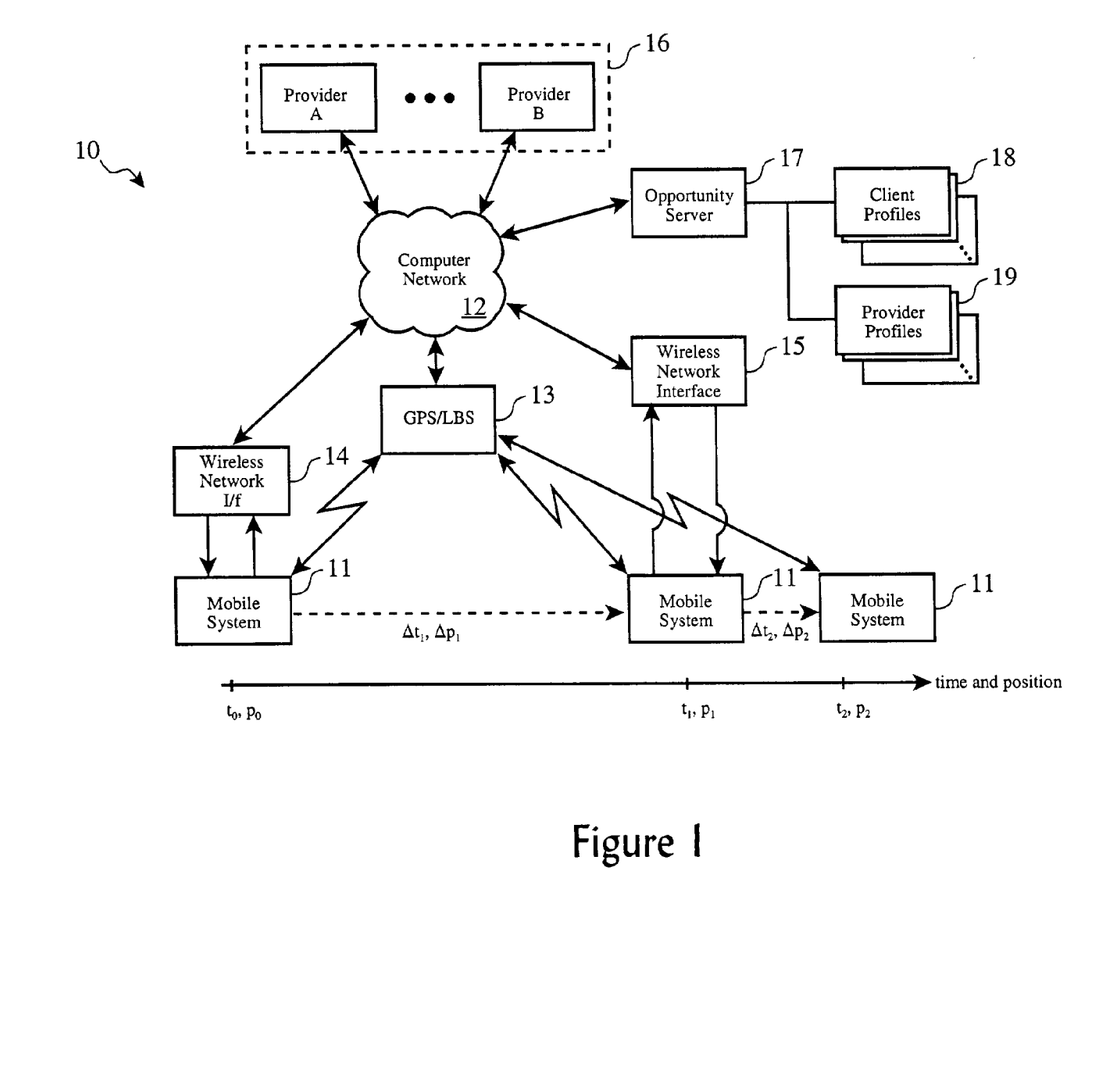
FIG. 1 shows the high level organization of the system according to the invention.

The system and method integrate several well-known technologies via an application server and one or more computer networks, as shown in FIG. 1. The following technologies and terminologies are used within this disclosure.

Location Based Services ("LBS")—a set of services which are associated with and driven by the location of a device such as a wireless telephone, personal digital assistant, or other computer. LBS may use one of several available technologies to determine the geographic location of a device, including but not limited to GPS, the Federal Communication Commission's Enhanced 911 ("E911") or micro-networks such as open-standard BlueTooth.

Global Positioning System ("GPS")—any one of several available technologies for determining geographic position electronically, including most prevalently use of a network of satellites in geosynchronous orbit and a receiver to pinpoint the receiver's location. Older systems, such as LORAN and TRANSIT, may be used, as well. Regional positioning may be determined using signal triangulation or other methods commonly employed to determine in which cell in a cellular system a transceiver is located.

Computer network—most preferably the Internet, but also possibly local area networks ("LAN"), wireless area networks ("WAN"), private networks and intranets.

Wireless network—any suitable communications network for data transmission and reception including Personal Communications Systems ("PCS"), wireless LAN, light wave (e.g. infrared) networks, and radio-based data links, all of which may be of proprietary nature or may conform to one of many well-known wireless standards.

Mobile System—used generally to refer to any system which is able to diagnose its own faults and failures and which may be transported, and especially, but not limited to, the control and diagnostic computers for vehicles such as automotive Electronic Control Modules ("ECM"). A mobile system, however, does not have to be part of a vehicle, but may be vehicle-born, such as certain electronic systems carried in aircraft and ships which may need maintenance actions.

Enterprise Resource Planning ("ERP")—broadly, a set of activities and technologies employed by businesses to effectively plan and use their resources, including materials ordering, order receipt and fulfillment, billing and accounts payable, personnel scheduling and the like.

Supply Chain Management ("SCM")—a group of technologies and methods for coordinating the activities of multiple suppliers to achieve a goal such as delivering a service with certain materials. SCM includes the computer systems used to receive orders and requests for quotes, systems for determining current and future inventories, methods for calculating labor times and values, automated quote generation systems, and systems for executing orders and deliveries of materials.

Mobile System Diagnostic System—any system used to diagnose a mobile system such as a vehicle or other system which can be transported. We will use terms conventional to the automotive industry for this disclosure to broadly encompass similar terms from other mobile systems industries such as aviation, rail and maritime shipping. For example, we will refer to records regarding detected failures and potentially diagnosed root causes as Diagnostic Trouble Codes ("DTC"), and the computer which performs the monitoring of sensors, recording of failures and conditions, and transmission of DTC records as an electronic control module ("ECM"). It will be evident to those skilled in the art that the invention is not related to an automotive implementation, and that the use of these terms from automotive parlance is for understandability and presentation of a preferred embodiment only.

Turning now to FIG. 1, the general system organization (10) of the invention is shown. A mobile system, such as a car ECM, initially is a location or position $p_0$ at an initial time $t_0$ when a fault, failure or out-of-range condition is detected within a monitored system. Using a GPS or LBS subsystem such as a GPS receiver, the initial position $p_0$ is recorded with the DTC regarding the detected conditions, as well as with any DTC's which are the result of diagnostic analysis to determine the root cause of the detected condition.

For example, if a low fuel pressure level is detected, the ECM may record the position of the vehicle at the time the condition is detected in a first DTC, and may check other sensors for indications to assist in diagnosing the root cause of the failure. It may be diagnosed that the fuel filler cap may need to be checked or replaced. This diagnosis may be recorded in a second DTC, in typical ECM systems. According to the preferred embodiment, DTC's are recorded in a format commonly understood by automotive diagnostic computers, such as the International Standards Organization's Controller-Area Network ("CAN") or Society of Automotive Engineers' J1850 format. Any format which records this information, however, may be equally well employed to realize the invention, especially for non-automotive applications as previously discussed.

These DTC's are then transmitted to an opportunity server (17), via a first wireless network, and secondly by a computer network (12). According to the preferred embodiment, the wireless network interface is an IBM eNetworks Wireless Switch coupled with convention wireless data communications facilities such as a Personal Communications System ("PCS") transceiver. Other wireless network solutions, such as Motorola's Ricochet network, may be employed as well. The computer network is preferably the well-known Internet, but may be a proprietary or private network (e.g. LAN, WAN, etc.).

The opportunity server receives the DTC's, consults a set of user profiles to determine any user preferences (19) known for the driver (e.g. preference to take his or her car to dealers only), and then determines if there are any potential providers in the future vicinity of the mobile system (e.g. next or previous town on the travel route). Those potential providers (16) are then issued a bid request using ERP and/or electronic data interchange ("EDI") types of communications. To respond to the request for bid, each provider preferably certifies that they have (or will have) stock of necessary components, qualified staff on hand, and the necessary equipment to complete the maintenance action at the time of estimated arrival of the mobile system. Providers may be eliminated or sorted according to the user preferences, such as manufacturer dealers, automobile association ratings, etc.

One or more providers (16), then, may respond with quotes and estimates, which are then coalesced by the opportunity server (15) for downloading and presenting to the mobile system operator (e.g. car driver) via the computer network (12) and wireless interface (14). Presentation of the operator's options may be made graphically using a display on the vehicle's control panel (e.g. a TFT or LCD display on a car dashboard, computer display on a ship's helm, etc.), or audibly via a speakerphone or stereo system. The vehicle operator may then select a provider, which causes the opportunity server to confirm the bid and appointment to the winning provider.

When the mobile system arrives at the anticipated location $p_1$ on or about the anticipated time of arrival $t_1$, the service action may be made without unnecessary delays waiting for parts, personnel, or shopping for an acceptable cost or price.

If no provider is selected or no acceptable bid is made in the first search, the opportunity server (17) may repeat the search and offer process for a subsequent location $p_2$ and expected time of arrival $t_2$ which is either part of the operator's desired itinerary or within an acceptable deviation from the desired itinerary.

Figure 2:
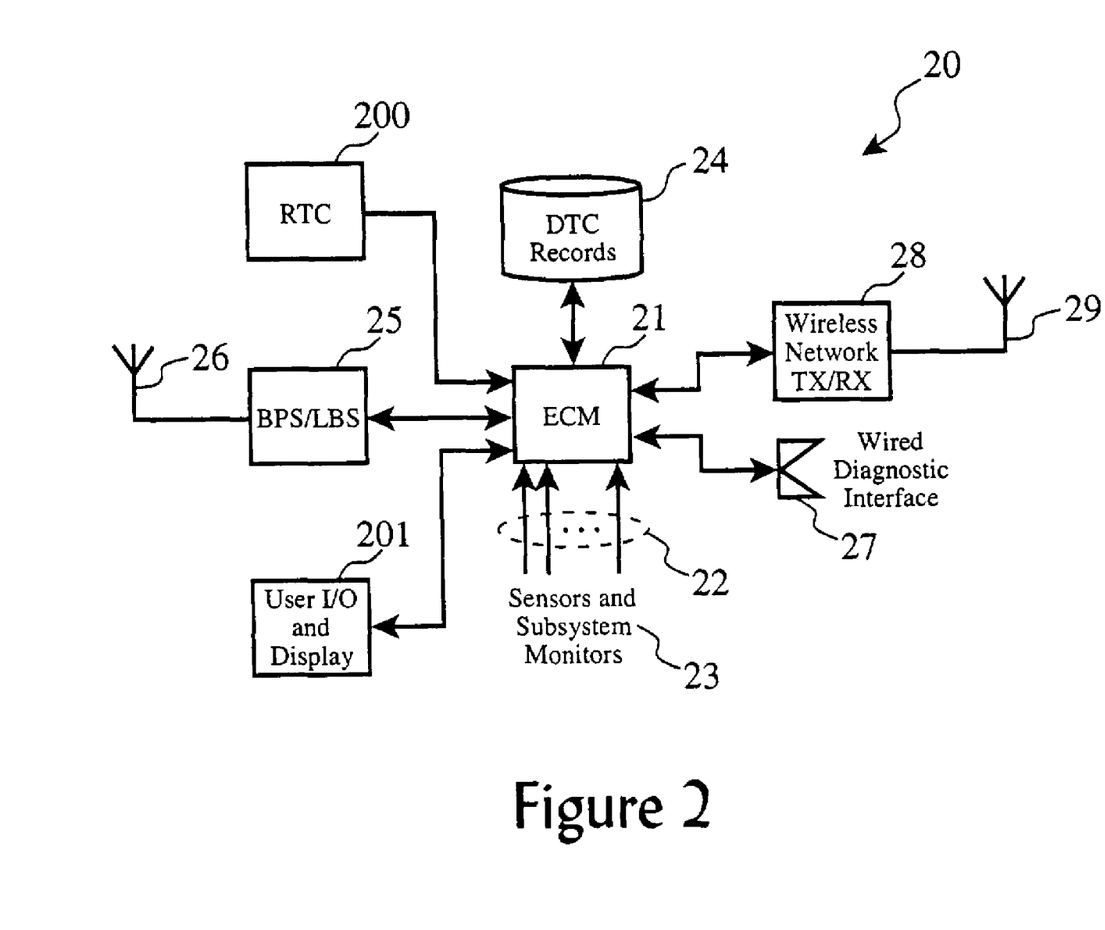
FIG. 2 provides details of an enhanced electronic control module.

Turning to FIG. 2, details of the enhanced ECM (20) of the mobile system according to the preferred embodiment are shown. The ECM (21), which includes a microprocessor or microcontroller, is interfaced (22) to a plurality of sensors and other subsystem monitors (e.g. controllers in a transmission, fuel injectors, etc.) via a bus such as the aforementioned J1850 or CAN bus, or appropriate proprietary or standard bus according to an alternate embodiment and vehicle application. Through this interface (22), the ECM receives information regarding detected failures, faults and out-of-range conditions, which are recorded in DTCs in the ECM memory (24).

The enhanced ECM (20) is also provided with location means, such as a GPS receiver or LBS-enabled wireless interface (25, 26), as well as a real-time clock (200). The location of the vehicle at the time of the detected event is recorded either with each DTC or in a separate DTC associated with the first DTC. Contact is then initiated through a wireless network interface (28, 29), such as a PCS interface, to the remote opportunity server, and the DTC's are transmitted or uploaded to the server.

Using the wireless network interface (28, 29), the enhanced ECM (20) may receive the coalesced opportunities (e.g. collected and qualified bids or offers from the providers) from the opportunity server, display or present them through the user interface (201), and receive a user selection. Presentation may be through a visual display, such as using an LCD or TFT display, or audibly using text-to-speech or telephone audio channels. The user's selection, such as a speech-recognized "yes" or "no" or input from a touch screen, may be transmitted back to the opportunity server via the wireless interface.

Some of these functions may be provided in combination with each other. For example, GPS operates on transmission of time-based signals from satellites to the GPS receivers, and as such, a GPS receiver includes a real-time clock. Also, a PCS phone which is LBS-enabled can also be employed as the wireless network interface.

Figure 3:
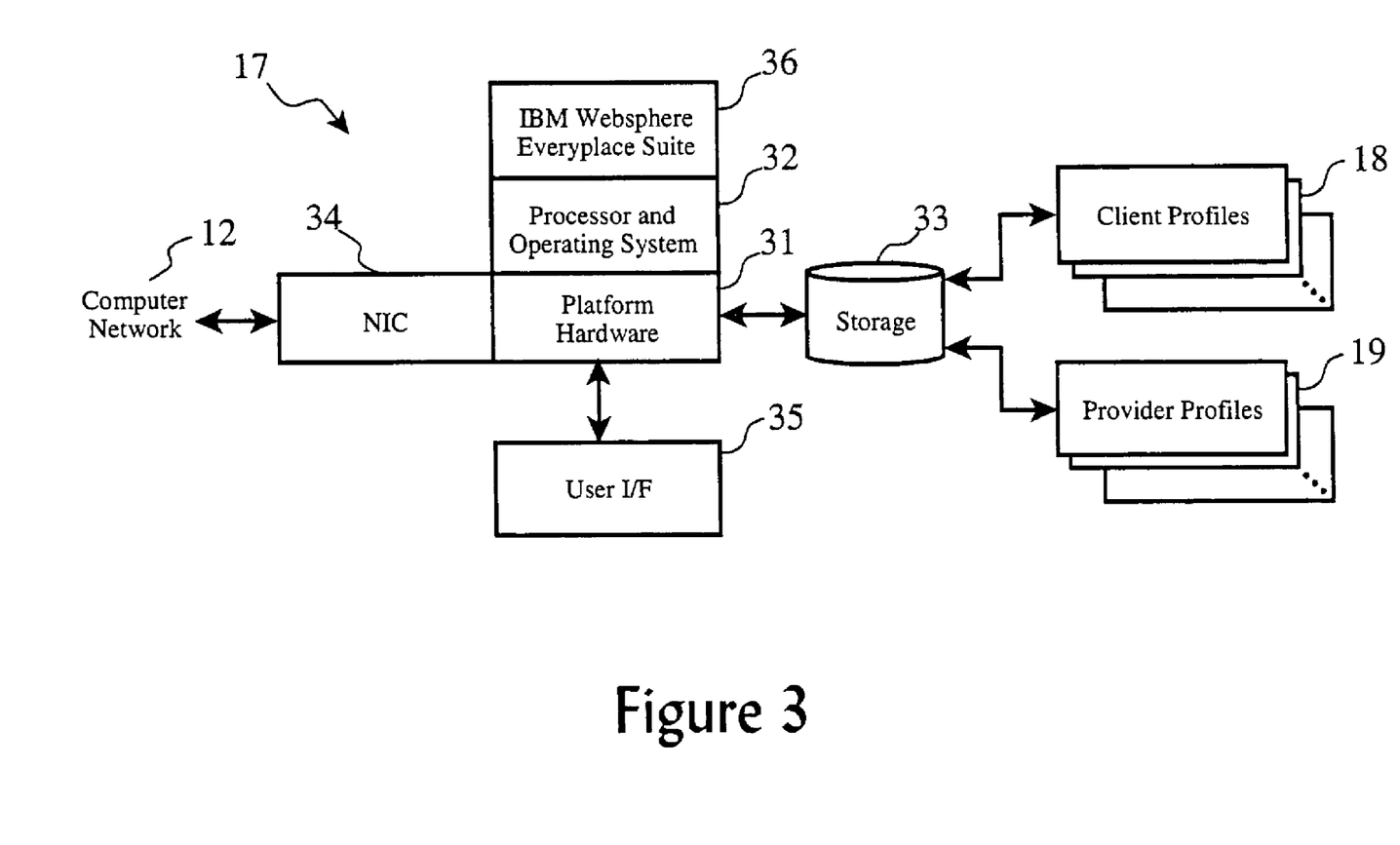
FIG. 3 provides details of the opportunity server.

FIG. 3 provides more details of the opportunity server (17), which includes a common web server computing hardware platform (31) and operating system (32). The computing platform is preferably an IBM eServer such as the IBM i-Series, or any other suitable computer platform such as an IBM-compatible personal computer, Sun Microsystem's server, or other capable computer. The hardware platform is also preferrably equipped with a network interface ("NIC") (34) for communication with the computer network (12) such as the Internet. The NIC (34) may be as simple as a modem, or as sophisticated as a high bandwidth digital subscriber loop ("DSL") or T-1 interface (or better). The hardware platform is also preferably provided with a set of user interface devices (35) such as a display, keyboard and mouse, for administration and configuration activities.

The operating system is preferably IBM's AIX operating system, which is well adapted to web server applications, but may also be any other suitable operating system including but not limited to IBM's OS/2, Sun Microsystem's Solaris, Unix, Linux, or Microsoft's Windows. The opportunity server is also preferably provided with one or more persistent storage devices (33) such as a disk array.

To realize the invention in the opportunity server, a web server suite, preferably IBM's WebSphere Everyplace Suite, is provided with a number of application programs or scripts to implement the logical processes of the invention, as described in the preceding paragraphs and in more detail in the following paragraphs. The WebSphere product is well known in the industry, and methods and tools for implementing custom logical processes for networked business solutions are commonplace as the WebSphere product is widely in use by businesses, financial institutions, and government agencies around the world. Other suitable a capable software programs and/or suites may be utilized in place of the WebSphere product without departing from the spirit and scope of the present invention.

Figure 4:
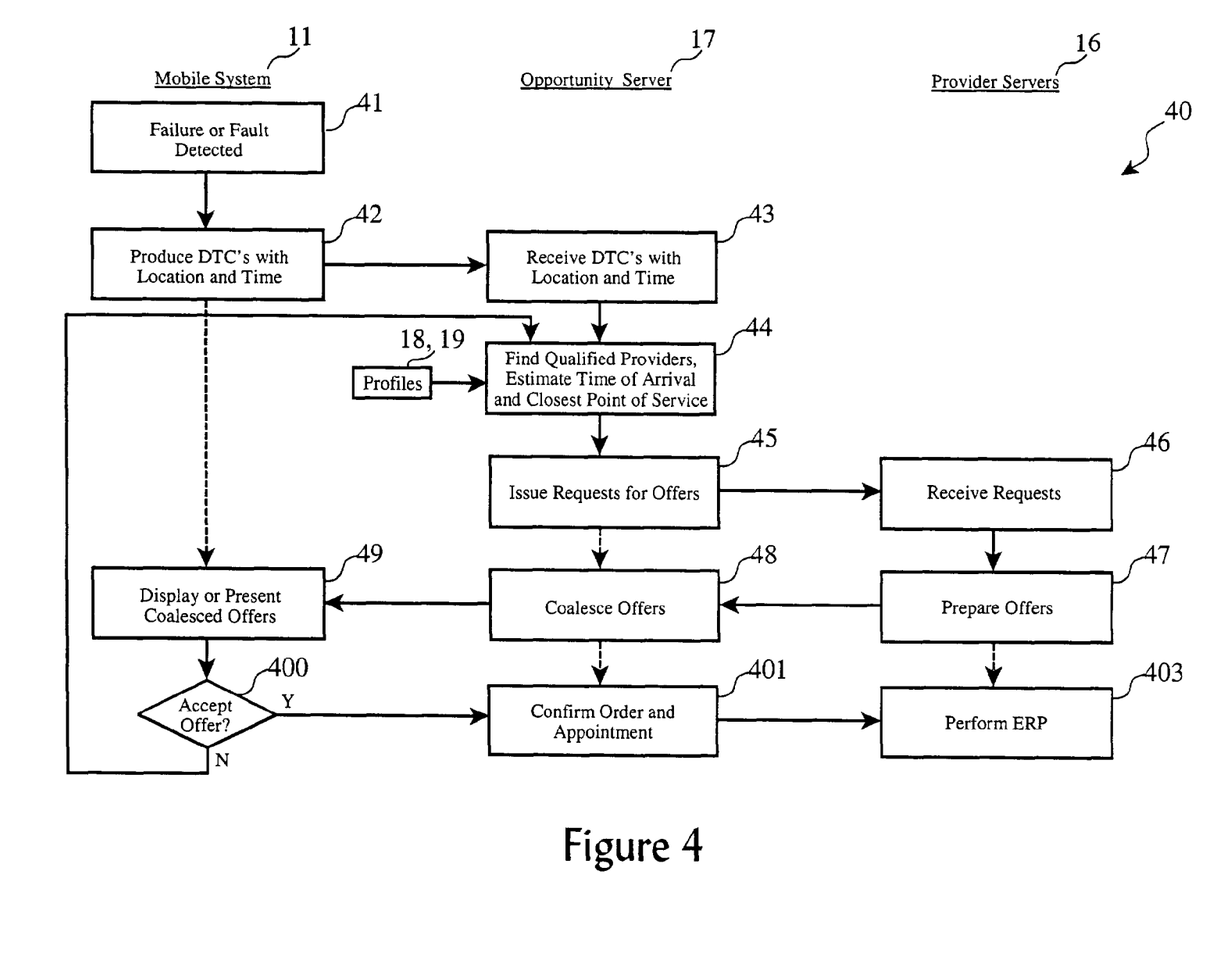
FIG. 4 sets forth the logical process according to the invention.

The logical processes are preferably implemented in part in the mobile system's enhanced ECM (e.g. firmware or software), in part in the customizable logical processes (e.g. Java, scripts, etc.) on the opportunity server, and in part by the provider's servers. These logical processes are shown in FIG. 4 with their cooperative interactions.

When the enhanced ECM detects a fault condition, failure, or out-of-range measurement (41) on the mobile system, it produces (42) one or more DTCs, and transmits those with the mobile system's time and location to the opportunity server, preferably via a wireless network.

The opportunity server then receives (43) the DTC's, and proceeds to check the user's profile and the provider profiles (18, 19) which are in the area of the next expected point of service (e.g. next or closest town, port, airport, etc.). Then, the DTC's are processed (45) to create requests for bids for the needed service repair, and are transmitted via the computer network to one or more provider servers.

Each provider servers receive (46) the requests, prepares (47) one or more offers if the provider is able to perform the maintenance service, and transmits these back to the opportunity server.

The opportunity server "coalesces" (e.g. modifies and combines) these offers by first screening them to meet the user's preferences, followed by organizing them into a format which is easily and uniformly presented to the mobile system operator. This may include performing text-to-speech conversion to allow for audible presentation via a telephone channel, adjusting and filtering graphics for presentation on a dashboard display which has limited capabilities, and minimizing text for quicker reading.

The coalesced offers are then transmitted preferably on the wireless network to the enhanced ECM, where they are presented to the mobile system operator (49) through display, audio, or both. The user can then accept an offer (400), such as by making a verbal election or touching an icon on a touchscreen, which results in the selection being transmitted to the opportunity server, which in turn performs a confirmation transaction (400) with the winning provider server. The selected provider server then performs enterprise resource planning functions (403) to order and deliver replacement parts to the point of service, schedule appropriately skilled personnel to be on call at the expected time of arrival, and to reserve an appointment for service.

If the mobile system operator declines all offers (402), then the opportunity server may widen the "bid pool" to include service providers which are located at a subsequent point of service (e.g. two towns away, two ports away, etc.), and/or which do not completely meet the user's preferences. For example, if the user prefers to have his car repaired at dealer-owned shops but no dealers are found, the bid pool is widened to include any qualified shops for the user's make of car.

To annotate FIG. 4 by way of example, suppose a car modified according to the present invention in route from Dallas to Austin, Tex., undergoes a failure in the fuel system. The ECM detects that fuel pressure is abnormally low, but that sensors on the fuel injectors indicate acceptable fuel flow. This causes a first DTC to be created for a low fuel pressure, and a second DTC to be created for a potential root cause of a loose or damaged fuel filler cap (42). Additionally, the location of the vehicle is determined using GPS, and a third time-location DTC is created.

When the opportunity server receives (43) these 3 DTC records, it immediately consults the user's profile and finds that he prefers to have his car repaired by the dealers associated with the manufacturer of his vehicle. So, using the location information, a database of providers is searched looking for dealers in the next town where the vehicle will be arriving, perhaps Waco, Tex., and towns which the vehicle has recently passed, perhaps Temple, Tex. This determination of points of service within the vehicle's vicinity can be made several ways. In its simplest form, the user may input the towns on the ECM's user interface, which can be included in the third DTC. Alternately, two successive GPS measurements can be made, which can be used to calculate vehicle direction and velocity, which can also be included in the DTC and used by the opportunity in conjunction with a digital map to determine upcoming towns on the vehicle's path. An estimated time of arrival can be either calculated using this information, or provided directly by the vehicle operator.

Once a set of qualified providers has been determined, requests for bids can be transmitted to the provider's servers online, through means such as EDI, email, fax, etc. The providers' servers receive the requests, and in this example, determine if they can have parts (e.g. a fuel cap for the user's make and model of car) and skilled staff on hand at the estimated time of arrival of the vehicle. An offer can be generated, if desired, and transmitted back to the opportunity server, again using e-mail, EDI, fax, etc.

The opportunity server collects all of the returned offers, formats and filters (e.g. "coalesces") them for presentation to the user, and sends them to the vehicle using the wireless network. In our example, let's assume that the quote price from two dealers is too high for the driver to accept, so he rejects (102) all of the offers, which allows the opportunity server to search for dealers in the next farther towns, perhaps Austin, Tex., and Grand Prairie, Tex., as well as for non-dealer service shops in Waco capable of performing the repairs. Requests for bids are produced and transmitted (45), and offers from 2 dealers in Austin and a Pep Boys store in Waco are received, coalesced (48), and presented (49) to the driver.

The driver then may select a lower priced dealer offer in Austin, if available, or a closer offer from Pep Boys if it is less expensive, which then results in the scheduling (403) of the service at the selected provider's facilities.

The invention presented herein meets the objectives and needs not presently met by systems and methods currently available. It allows an operator of a mobile system or vehicle to effectively schedule and negotiate for service actions while in transit, with minimized delay and perturbation to a desired itinerary or schedule, while incurring minimal unexpected expenses.

What is claimed is:

1. A method comprising:

receiving a signal from a mobile system indicating a need for a transaction with a business entity responsive to an on-board diagnostic detection of a real-time fault condition resulting in recording of a Diagnostic Trouble Code;

responsive to said receipt of said signal, automatically issuing a plurality of requests for bids for said transaction to a plurality of provider parties located in a first potential geographic point for repair service, said requests indicating estimated times of arrival at each said potential geographic point for repair service;

responsive to said request for bids, receiving a plurality of offers from said plurality of provider parties for said business transaction;

responsive to said receipt of said plurality of offers, automatically coalescing said plurality of offers from said plurality of provider parties, wherein said coalescing comprises screening said offers to meet one or more user preferences, and modifying and organizing said offers into a format for uniform presentation to a user;

presenting said coalesced offers to an operator of said mobile system; and responsive to selection of one or more presented offers, automatically performing enterprise resource planning for said business transaction with one of said responding providers, said enterprise resource planning including certifying that, at an estimated time of arrival, one or more conditions selected from a group consisting of whether or not necessary components will be in stock, whether or not qualified staff will be on duty, and whether or not all necessary equipment will be available will be met.

2. The method as set forth in claim 1 wherein said issuing one or more requests for bids comprises consulting one or more user profiles and one or more provider profiles to determine which, if any, provider parties are qualified to receive a request for bid for the requested transaction.

3. The method as set forth in claim 1 further comprises repeating issuing requests, coalescing and presenting offers responsive to a declination of all previously presented offers by said operator such that additional provider parties are invited to bid from a next potential geographic point for repair service at a next estimated time of arrival.

4. A computer memory comprising:
a computer readable memory suitable for encoding computer programs; and
one or more computer programs encoded by said computer memory and configured to:
receive a signal from a mobile system indicating a need for a transaction with a business entity responsive to an on-board diagnostic detection of a real-time fault condition resulting in recording of a Diagnostic Trouble Code;
responsive to said receipt of said signal, automatically issue a plurality of requests for bids for said transaction to a plurality of provider parties located in a first potential geographic point for repair service, said requests indicating estimated times of arrival at each said potential geographic point for repair service;
responsive to said request for bids, receive a plurality of offers from said plurality of provider parties for said business transaction;
responsive to said receipt of said plurality of offers, automatically coalesce said plurality of offers from said plurality of provider parties, wherein said coalescing comprises screening said offers to meet one or more user preferences, and modifying and organizing said offers into a format for uniform presentation to a user;
present said coalesced offers to an operator of said mobile system; and
responsive to selection of one or more presented offers, automatically perform enterprise resource planning for said business transaction with one of said responding providers, said enterprise resource planning including certifying that, at an estimated time of arrival, one or more conditions selected from a group consisting of whether or not necessary components will be in stock, whether or not qualified staff will be on duty, and whether or not all necessary equipment will be available will be met.

5. The computer memory as set forth in claim 4 wherein said issuing one or more requests for bids comprises consulting one or more user profiles and one or more provider profiles to determine which, if any, provider parties are qualified to receive a request for bid for the requested transaction.

6. The computer memory as set forth in claim 4 further comprising computer program configured to repeatedly issue requests, coalesce and present offers responsive to a declination of all previously presented offers by said operator such that additional provider parties are invited to bid from a next potential geographic point for repair service at a next estimated time of arrival.

7. A system comprising:
a computing platform having a hardware means for performing a logical process;
a signal receiver portion of said computing platform configured to receive a signal from a mobile system indicating a need for a transaction with a business entity responsive to an on-board diagnostic detection of a real-time fault condition resulting in recording of a Diagnostic Trouble Code;
a requester portion of said computing platform configured to, responsive to said receipt of said signal, automatically issue a plurality of requests for bids for said transaction to a plurality of provider parties located in a first potential geographic point for repair service, said requests indicating estimated times of arrival at each said potential geographic point for repair service;
an offer receiver portion of said computing platform configured to, responsive to said request for bids, receive a plurality of offers from said plurality of provider parties for said business transaction;
a coalescer portion of said computing platform configured to, responsive to said receipt of said plurality of offers, automatically coalesce said plurality of offers from said plurality of provider parties, wherein said coalescing comprises screening said offers to meet one or more user preferences, and modifying and organizing said offers into a format for uniform presentation to a user;
an output portion of said computing platform configured to present said coalesced offers to an operator of said mobile system; and
a planner portion of said computing platform configured to, responsive to selection of one or more presented offers, automatically perform enterprise resource planning for said business transaction with one of said responding providers, said enterprise resource planning including certifying that, at an estimated time of arrival, one or more conditions selected from a group consisting of whether or not necessary components will be in stock, whether or not qualified staff will be on duty, and whether or not all necessary equipment will be available will be met.

8. The system as set forth in claim 7 wherein said requester portion is configured to consult one or more user profiles and one or more provider profiles to determine which provider parties are qualified to receive a request for bid for the requested transaction.

9. The system as set forth in claim 7 further configured to repeatedly issue requests, coalesce and present offers responsive to a declination of all previously presented offers by said operator such that additional provider parties are invited to bid from a next potential geographic point for repair service at a next estimated time of arrival.

* * * * *